April 21, 1925.
W. E. NOAD
COMPRESSOR
Filed Jan. 17, 1924
1,534,728
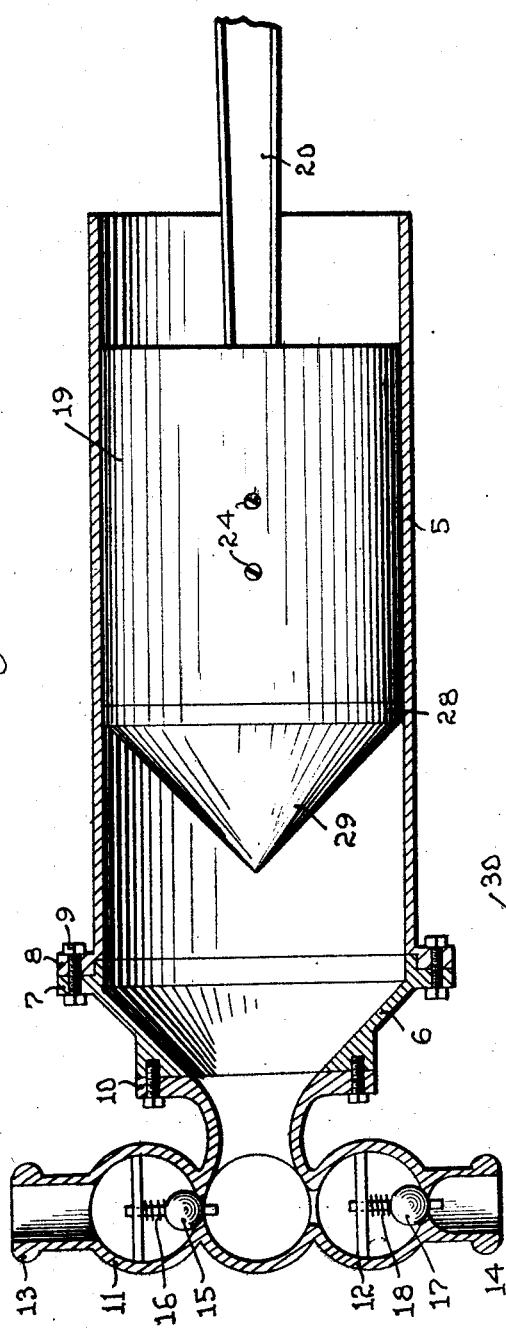
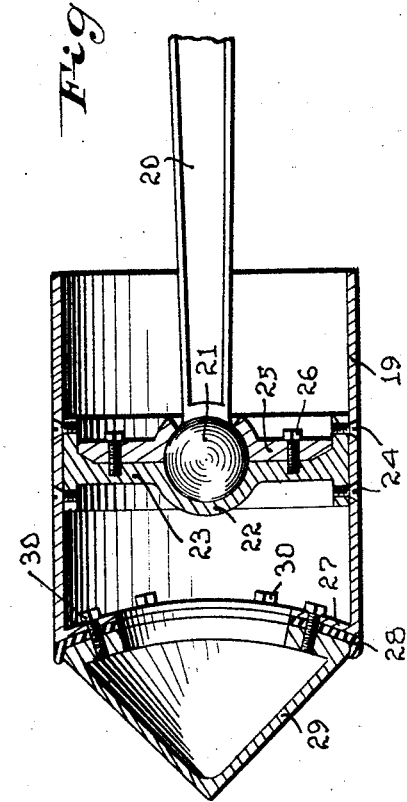
Inventor,
William E. Noad,
By Franks Aaaleman.
Attorney Patented Apr. 21, 1925.

1,534,728

UNITED STATES PATENT OFFICE.

WILLIAM E. NOAD, OF JACKSON, MICHIGAN.

COMPRESSOR.

Application filed January 17, 1924. Serial No. 686,862.

*To all whom it may concern:*

Be it known that I, WILLIAM E. NOAD, a citizen of the United States of America, and resident of Jackson, in the county of Jackson and State of Michigan, have invented certain new and useful Improvements in Compressors of which the following is a specification.

This invention relates to compressors, and has for an object the provision of a novel compressor having greater capacity as compared with compressors now in common use, and in which provision is made for producing maximum results through the employment of a minimum amount of power.

It is a further object of this invention to produce a compressor in which a piston is employed, provided with removable piston rings or suction washers whereby the device may be maintained in a highly efficient state by parts that may be readily installed.

It is a further object of this invention to produce a compressor of the character indicated in which a cylinder is provided with a conical head and in which a piston of complemental configuration operates.

It is a further object of this invention to produce a compressor cylinder having a valve casing connected thereto, associated with oppositely operating valves whereby the air may be drawn into the chamber and forced therefrom under a certain degree of pressure, depending upon the control of an exit valve associated with the valve casing.

With the foregoing and other objects in view, the invention consists in the details of construction and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a sectional view of a compressor cylinder and valve mechanism with the pitson in elevation; and Figure 2 illustrates a sectional view of the piston.

In these drawings, 5 denotes a cylinder having a sectional cylinder head, in that one section 6 is secured thereto by the apertured flanges 7 and 8 with fastenings 9 such as bolts, and the said section 6 of the cylinder head has an aperture communicating with a valve casing 10, which may also be said to constitute a section of the cylinder head, or a continuation thereof.

The element 10 has two valve chambers 11 and 12, each of which communicates with the cylinder. The valve chamber 11 has a discharge nipple or coupling 13, and the valve chamber 12 has an intake nipple or connection 14, and they may be provided with suitable piping or conduits by which the air may be delivered to the cylinder and discharged therefrom under pressure.

As shown in the present embodiment of the invention, the valve chamber 11 has a seat normally engaged by a valve 15 that opens outwardly to permit air to escape from the cylinder under pressure. The valve 15 is held on its seat by a spring 16 and obviously, the spring may be of such rigidity as to hold the valve seated until a predetermined pressure has been developed in the cylinder. The valve chamber may be provided with any suitable opening to permit the installation of the valve, and the inventor does not wish to be limited with respect thereto, and obviously, means may be provided of known structure for increasing or diminishing the tension of the spring in order that the valve may be caused to open at different pressures.

The chamber 12 is supplied with an inwardly opening valve 17 held on its seat by a spring 18, but the spring 18 is relatively lighter than the spring 16, as it is the purpose of the inventor that the valve 17 shall open under the suction stroke of the piston to supply air for compression.

The piston 19 has a piston or connecting rod 20 oscillatably attached to it, and as here shown, the connecting rod has a ball 21 on its end that fits in a socket 22 of the web 23. The web 23, in the present embodiment of the invention, is secured to the inner wall of the piston by fastenings 24 such as screws, although the inventor does not wish to be limited with respect to this feature. The ball of the connecting rod is held in place by a plate 25 that is secured to the web by fastenings 26 such as screws, so that when the connecting rod is reciprocated, it will serve to operate the piston in the cylinder.

The inner end of the piston is provided with a concave flange or head 27 that constitutes a seat for a packing ring or sucker 28, the said packing ring being clamped between the supplemental or conical end 29 of the piston, whose inner end conforms to the configuration of the flange, and the said end of the cylinder is connected to the flange by fastenings 30 such as screws. The supplemental end of the piston has a configuration conforming to the configuration of the cylinder head and the angle illustrated is believed to be mechanically correct, although obviously, the angle of the walls of the cylinder head and the piston may be changed to suit conditions, if such change would result in benefit.

I claim:

1. In a compressor, a cylinder, a piston head having a conical inner wall secured thereto, a member constituting an extension of the cylinder and a valve casing connected to said member, said piston having its end contoured to the configuration of the inner wall of the cylinder head, substantially as described.

2. In a compressor, a cylinder, a piston head having a conical inner wall secured thereto, a member constituting an extension of the cylinder and a valve casing connected to said member, said piston having its end contoured to the configuration of the inner wall of the cylinder head, and an outwardly and an inwardly opening valve associated with the valve casing for controlling the passage of air therethrough, substantially as described.

3. In a compressor, a cylinder, a cylinder head thereon provided with a conical inner wall, a valve in communication with the said cylinder head, a piston in the said cylinder having a concave surface at its outer end constituting an anchorage, a packing element on the said surface, a piston end secured on the packing, the said piston end being conical and conforming to the contour of the inner wall of the cylinder, and a connecting rod for the said piston.

4. In compressor, a cylinder, a cylinder head thereon provided with a conical inner wall, a valve in communication with the said cylinder head, a piston in the said cylinder having a concave surface at its outer end constituting an anchorage, a packing element on the said surface, a piston end secured on the packing, the said piston end being conical and conforming to the contour of the inner wall of the cylinder, a web in the said piston having a socket, a connecting rod having a ball fitting in the socket, and means for holding the connecting rod in assembled relation to the web.

WILLIAM E. NOAD.